Oct. 27, 1925.　　　　　　　　　　　　　　　　1,559,391
F. WATERS
AUTOMOBILE LIFTING DEVICE
Filed July 1, 1924　　　　3 Sheets-Sheet 3
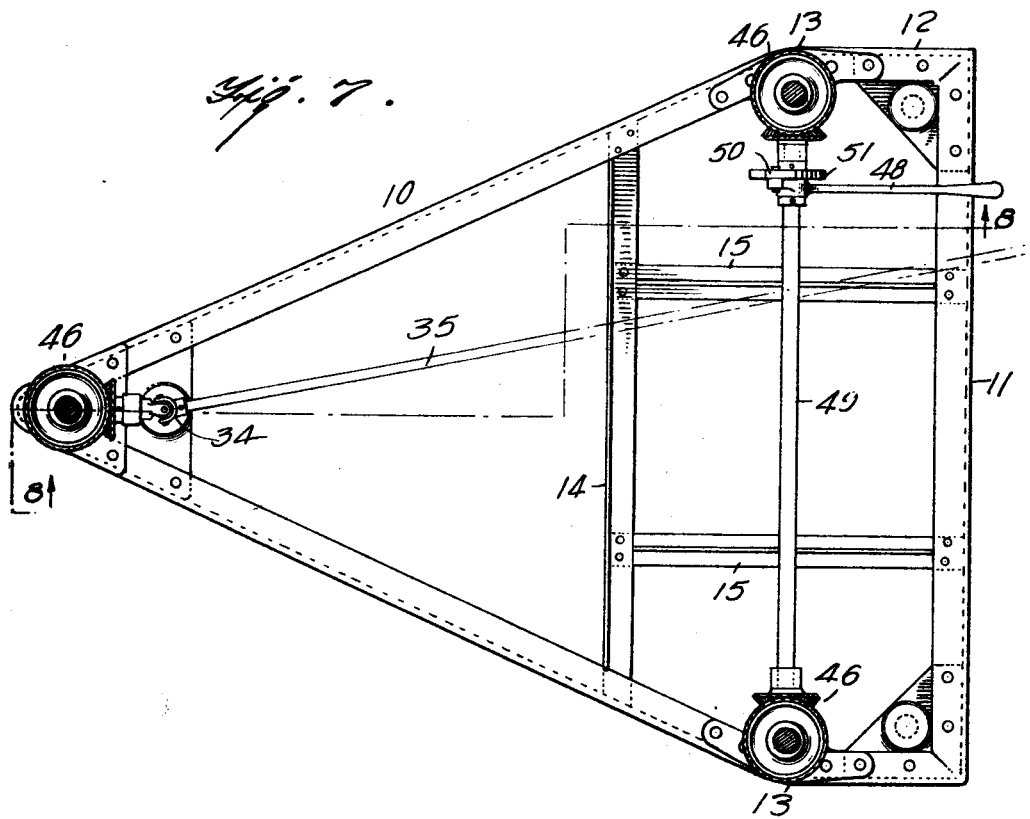
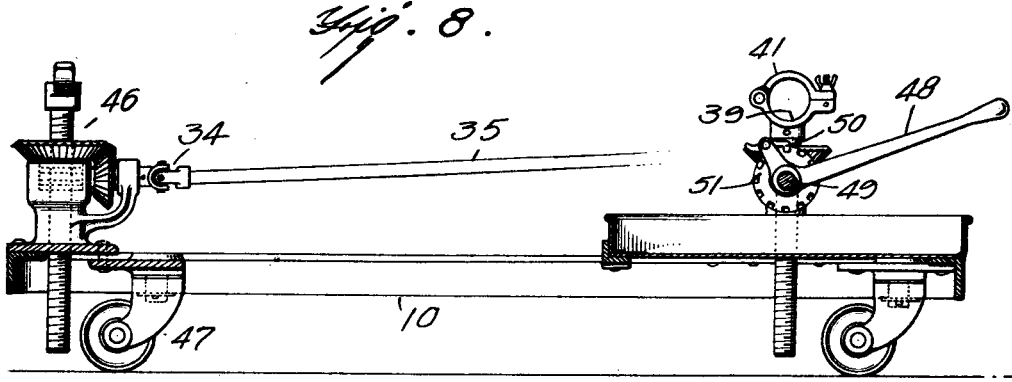
Inventor
FREDERICK WATERS,
By
Attorney Patented Oct. 27, 1925.

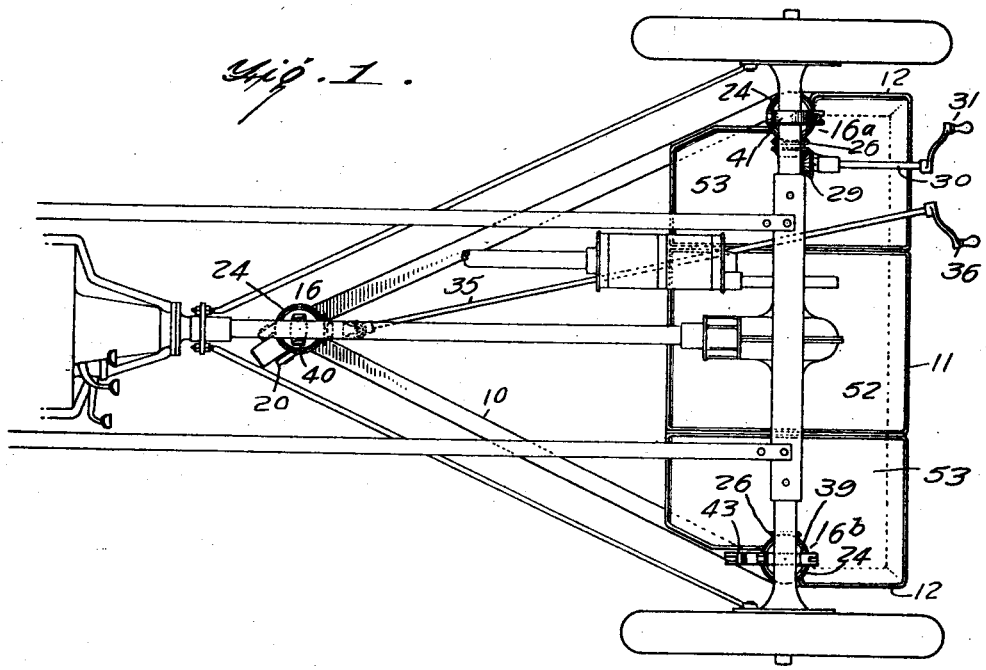
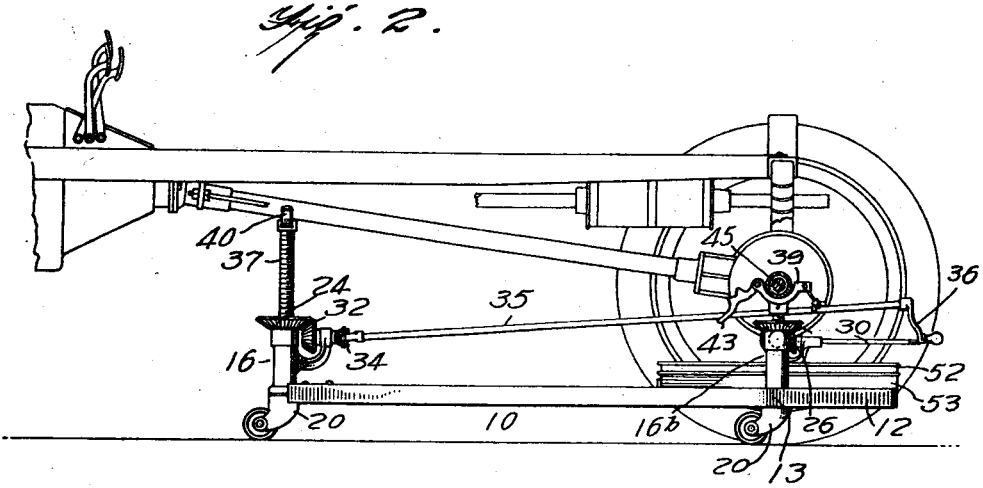

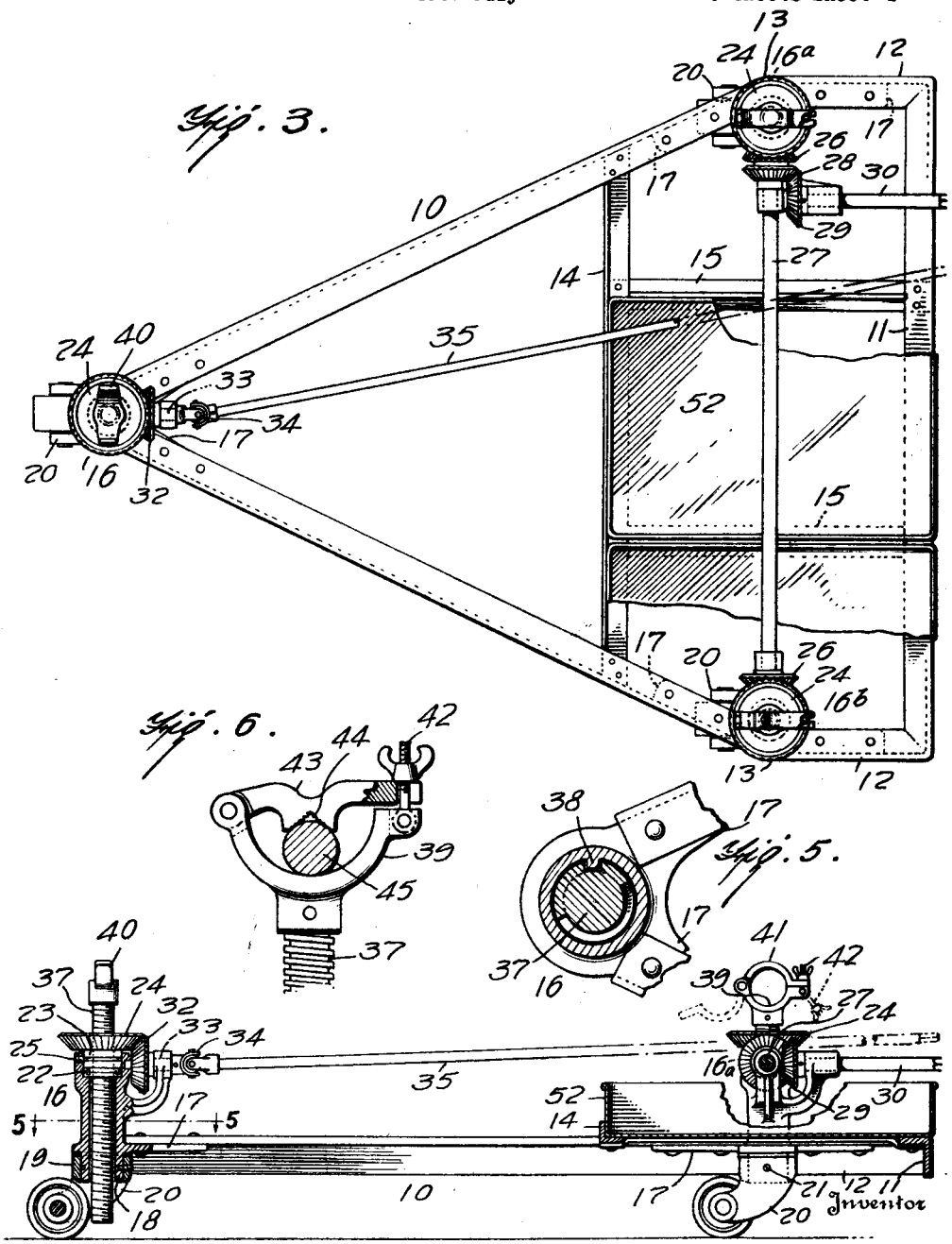

1,559,391

UNITED STATES PATENT OFFICE.

FREDERICK WATERS, OF LYONS FALLS, NEW YORK.

AUTOMOBILE LIFTING DEVICE.

Application filed July 1, 1924. Serial No. 723,579.

*To all whom it may concern:*

Be it known that I, FREDERICK WATERS, residing at Lyons Falls, county of Lewis, and State of New York, a citizen of the United States, have invented certain new and useful Improvements in Automobile Lifting Devices, of which the following is a specification.

Great difficulty is occasioned in an automobile repair shop or garage in disconnecting the rear end of an automobile, or, particularly in the stock Ford car, from the chassis. As the rear end includes the rear axle, the drive shaft and the differential gearing together with their respective housings, the disassociation of the drive shaft from the transmission housing which is at the universal joint renders the management or handling of the rear end a very difficult task. This operation requires the services of a skilled mechanic together with one or more helpers and usually consumes a great deal of time. The difficulty experienced in the replacement or assembly of the rear end to the chassis is, of course, an arduous task.

To overcome this and other objectionable features in disconnecting the rear end of an automobile from the chassis, my invention consists of a simple, compact and highly efficient device that may be readily moved about the floor, and which, among other important advantages, can be manufactured at a very nominal cost. The scope of my invention extends to whatever constructions may be defined by or included within the terms or language of the appended claims.

In the drawings:

Figure 1 is a top plan view of my improved automobile lifting device illustrating a fragmentary portion of a Ford car in position;

Figure 2 is a side view thereof;

Figure 3 is an enlarged plan view, parts broken away;

Figure 4 is a central longitudinal section on the line 4—4 of Figure 3;

Figure 5 is a detail sectional view on the line 5—5 of Figure 4;

Figure 6 is a detail side view of one of the shaft clamping members;

Figure 7 is a top plan view of another form of my invention and

Figure 8 is a central sectional view on the line 8—8 of Figure 7.

My invention, in the form or embodiment shown in the drawings and briefly described, comprises a main frame, 10, constructed of angle iron and comprises an end member, 11, right angular bent side members, 12, which are arranged parallel to each other, for a relatively short distance, from which point, 13, they are bent forwardly and inwardly converging to a point.

An angle iron, 14, is extended between the converging angle side bars and is riveted thereto. A pair of inverted T-shaped bars, 15, are extended between the bar, 14, and the end bar, 11, and likewise riveted at the extreme ends thereof. A bar, 14, together with the bars, 15, it would be readily seen from Figures 3 and 7, substantially brace the frame work, besides having an additional function, as will be hereinafter more fully described.

In Figures 1, 2, 3 and 4 are illustrated combined lifting jack and roller supporting means designated 16, 16ª and 16ᵇ. The members, 16, 16ª and 16ᵇ, which are preferably in the form of a casting, are each provided with a central bore and near their lower ends with horizontally extending arms or ribs, 17, to which are suitably riveted the side members of the angle irons forming the frame work, 10, for the purpose of providing a very rigid and comparatively light construction. At the lower extremity of these members, 16, 16ª and 16ᵇ, I provide annular extensions, 18, for the purpose of receiving the collar portions, 19, of the roller or castor supports, 20. To prevent the displacement of the castor supports with respect to the annular extensions and yet permit them to rotate freely I provide an annular groove near the lower end of the annular extension which is adapted to engage with the inner end of a set screw, 21, which is suitably threaded into the collar portion, 19.

The openings or bores within members 16, 16ª and 16ᵇ are enlarged at their upper ends for the purpose of receiving anti-friction washers, 22, and the lower ends or extensions, 23, of the bevel gears, 24. The extensions, 23, are likewise provided with annular grooves for the purpose of receiving set screws, 25, for preventing their accidental displacement.

For the purpose of driving the oppositely disposed bevel gears, 24, at the rear of my improved auto lifting device simultaneously, I provide a pair of bevel gears, 26, which are secured on opposite ends of a shaft, 27.

A bevel gear, 28, is also mounted on the shaft, 27, and is adapted to mesh with the gear, 29, to which is secured one end of a stub shaft, 30, for the purpose of rotating the oppositely disposed gears, 24, by means of a crank, 31, or the like.

In order that the gear, 24, at the extreme forward end of my auto lifting device may be rotated from the rear, I provide a bevel gear, 32, which is secured to one end of a stub shaft, 33. To the opposite end of the stub shaft, 33, I secure a universal coupling, 34, which is also connected to one end of the drive shaft, 35. A crank, 36, which is similar to the crank, 41, may be employed for rotating the shaft, 35. For the purpose of supporting the various horizontal shafts and their respective gears, I form suitable bearing carrying arms or supports which are preferably cast integral with the members, 16, 16ᵃ and 16ᵇ.

Shafts, 37, have threaded engagement with the bevel gears, 24, and are adapted to extend through the vertical bores within their respective castings. To prevent the threaded shafts, 37, from rotating within their respective members, while in operation, I provide each with a centrally extending groove, which is adapted to engage with the rib, 38, formed integral with the respective members.

At the upper extremity of each of the oppositely disposed threaded shafts, 37, I secure a semi-circular supporting member, 39, for the purpose of receiving the tubular rear axle housing of an automobile, whereas the forwardly extending threaded shaft, 37, carries at its upper end a saddle member, 40, for the purpose of supporting the free end of the tubular drive shaft housing.

41 indicates a semi-circular arm which is pivoted to the supporting member, 39, and is provided with a pivoted bolt and wing nut, 42, for locking the same to the rear axle housing as desired. When it is desired to securely clamp or support the axle after the rear axle housing has been removed therefrom, I employ a swinging arm, 43, which is provided with suitable gripping teeth, 44, for the purpose of securely locking the drive shaft, 45, with respect to the supporting member, 39. This is accomplished by means of the threaded bolt and wing nut, 42, as is clearly indicated in Figure 6 of the accompanying drawings.

In Figures 7 and 8 I illustrate a somewhat different embodiment of my invention. In this form I construct the lifting members, 46, and the caster or roller supports, 47, of separate units, which permits me to arrange the castors, 47, in such a manner as to more accurately balance the supporting frame, 10, when it is under load to effectually prevent its tilting. In Figures 7 and 8 I have also illustrated another form for rotating the oppositely disposed lifting members, consisting of a lever, 48, which is loosely mounted on the shaft, 49, and is provided with a pivoted pawl, 50. A toothed wheel, 51, is secured to the shaft, 49, and is adapted to be engaged by the pawl, 50, for imparting rotation thereto.

The operation of my improved auto lifting device will now be apparent by referring to the several views of the accompanying drawings. When it is desired to remove the rear end from an automobile, the body of the car is suitably supported, and my improved device is rolled beneath the rear end of the car, and the several lifting jacks elevated to the position illustrated in Figures 1 and 2. It will thus be readily seen that when the several supporting bolts from the springs have been removed and when the tubular drive shaft housing has been disconnected from the ball and socket joint, the entire and completely assembled rear end can be readily rolled out from under the car without danger of the drive shaft housing slipping off on to the floor and being damaged. It will also be readily seen that the rear end itself may be disassociated into as many parts as is required, which will be facilitated by the use of my improved lifting device.

In order to prevent the grease in the rear end from leaking to the floor during the repairing operation, I provide a grease pan, 52, which is centrally located and supported between the parallel inverted T-shaped members, 15, as is clearly illustrated in Figure 3. On either side of the grease pan, 52, are placed pans, 53, for the purpose of receiving the necessary tools incidental to repairs of this nature. It will be readily seen that the upwardly extending portions of the inverted T-shaped members, 15, will also serve as guides for the pans, 52 and 53.

I claim:

1. In an automobile lifting device, a main frame having the forward portion triangular in plan and the rear portion rectangular in plan, supporting rollers at the corners of the triangular portion of the frame, lifting jacks at the corners of the triangular portion of the frame, means connecting the lifting jacks at the base portion of the triangular part of the frame for simultaneous operation, means operative beyond the rectangular portion of the frame for independently operating the jack at the apex of the triangular portion, means for operating the connected jacks at the base of such triangular portion, and receptacle supporting means extending in both directions beyond the means connecting the jacks at the base of the triangular portion of the frame.

2. In an automobile lifting device, a skeleton frame having a rear frame bar, and side bars extending forwardly for a distance at right angles to the rear bar and then converging to a point at the forward end of the frame, to thereby provide a rectangular rear portion and a triangular forward portion, a brace bar extending transverse the triangular portion in parallelism with the rear frame bar, said rear bar and brace bar being formed to support a receptacle, jacks at the corners of the triangular portion of the frame, means for operating the jacks, and means for movably supporting the frame.

In testimony whereof I hereunto affix my signature.

FREDERICK WATERS.